Sept. 30, 1969   C. L. THOMSON   3,469,914
ENLARGER HEAD FOR USE WITH VARIABLE CONTRAST PAPER
Filed Nov. 4, 1966
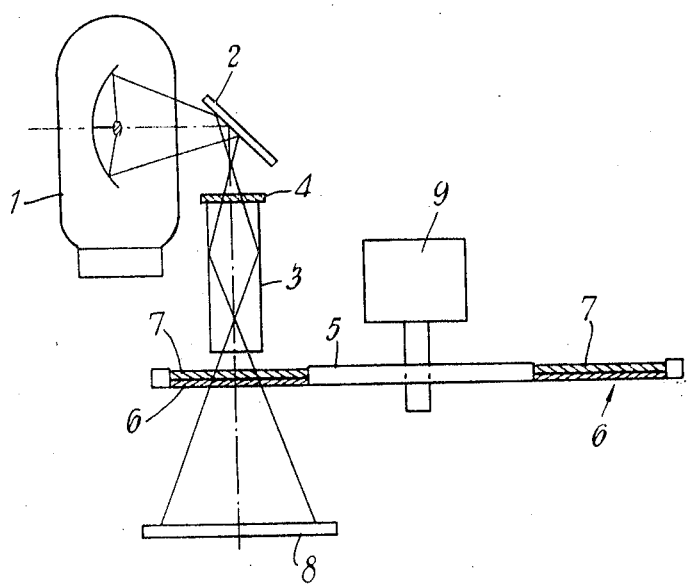
Inventor
Charles Leslie Thomson
By Cushman, Darby & Cushman
Attorneys 3,469,914
ENLARGER HEAD FOR USE WITH VARIABLE
CONTRAST PAPER
Charles Leslie Thomson, Kingston, Liberton,
Edinburgh 9, Scotland
Filed Nov. 4, 1966, Ser. No. 592,098
Int. Cl. G03b 27/32, 27/52, 27/76
U.S. Cl. 355—32          6 Claims

ABSTRACT OF THE DISCLOSURE

Photographic prints are produced on variable contrast photographic printing material by the use of a set of color filter units. Each filter unit comprises a colored filter producing a different exposure and a neutral density filter having an optical density such that prints of varying contrast are produced using substantially constant time irrespective of which filter unit is employed.

---

This invention relates to the production of prints on variable-contrast photographic printing material, usually printing paper.

Variable-contrast printing papers have been known for many years and are based on the use of a photographic emulsion, or combination or mixture of emulsions, which react differently to differently colored printing light in the sense of yielding from a standard negative original prints of varying contrast according to the color of the printing light used.

Thus for example one such material comprises two gelatino-silver halide emulsions, one of which is designed to afford images of high contrast while the other is designed to afford images of low contrast. The emulsions are arranged to be sensitive to light in different regions of the spectrum. Thus for example the low-contrast emulsion may be blue-sensitive and the high-contrast emulsion may be sensitised to the green and/or red regions of the spectrum. It then arises that accordingly as the color of the exposing light varies, more of one and less of the other emulsion will be effectively exposed and the net contrast of the developed prints will correspondingly vary.

The usual technique employed in the production of prints on such a material is to provide a set of color filters of different color transmission characteristics, varying from one extreme to the other of the sensitivities of the emulsions.

By the appropriate selection of the filter used to control the color of the printing light, it then arises that negatives representing a wide range of contrasts can be printed on the one type of printing paper, each yielding a print of the desired contrast characteristics.

However, the system as operated at present, suffers from some disadvantages. Thus, when it is desired to make a change in the effective contrast of the paper by changing filters it also becomes necessary to modify the exposure given to the print. Since the required change in exposure varies with the degree of alteration that is being made in the contrast of a print, it is often necessary to expose an additional test strip before the final print can be made with assurance of a satisfactory result. Further, for convenience in operation, the contrast changing filters are usually placed in the printing beam below the enlarger lens—thereby impairing to some extent the quality of the projected image. (An alternative position for the filters is above the condenser, in the enlarger head, but this gives rise to considerable inconvenience in practice).

It is an object of the present invention to provide a printing method and apparatus in which the optimum printing time for any negative remains unchanged throughout the whole of the available contrast range. It is a further object of the invention to provide apparatus for the aforesaid method having improved means for locating the filters in their operative position.

According to the present invention there is provided a method for the production of prints on variable contrast photographic printing material of predetermined speed and contrast characteristics, by the use of a set of color filter units severally locatable in the path of the printing light between the light source and the negative to be printed characterised in that the optical densities of the filter units are adjusted in relation to the printing material so that the exposure time required to make a print of standard density, but varying contrast, from a negative is substantially constant irrespective of which of the filter units is located in the said path.

According further to the present invention there is provided a photographic enlarger head apparatus for use in making prints on variable contrast photographic printing material of predetermined speed and contrast characteristics which comprises a set of color filters severally locatable in the path of the printing light between the light source and the negative transparency from which the print is to be made, the said filters each having an optical density such that the exposure time required to make a print of standard density, but varying contrast, from a negative is substantially constant irrespective of which of the filters is located in the path of the printing light.

The filter units are preferably each composed of a filter element and a "neutral density" filter, superimposed thereon, of required density to fix the total transmittance of the pair to a predetermined value. By this means, the exposure time for a given negative will be constant, and independent of which filter is inserted in the beam.

The filter units are conveniently mounted in a movable carrier, so designated as to locate each filter unit accurately in the optical path of the enlarger. The position of such a carrier may be electrically controlled by any conventional mechanism.

Means may also be provided for protecting the filter units from the heat of the beam from the light source.

A particularly preferred embodiment of the present invention will now be described with reference to the accompanying drawing, in which is shown in diagrammatic form the lamphouse of a photographic enlarger according to the invention.

Referring to the drawing, the lamphouse contains a lamp 1 provided internally with a concave mirror, an aluminized mirror 2, set at 45° to the axis of the lamp 1, a sheet of heat-absorbent glass 4 and a mirror tunnel 3. Light emerges horizontally from lamp 1, is turned through 90° by mirror 2, filtered by the glass sheet 4 and transmitted downward via mirror tunnel 3. Below the lower end of this tunnel is a diffuser 8, which serves as the secondary light source in the enlarger head. Between the lower end of the lower mirror tunnel 3 and the diffuser 8 is a filter unit consisting of a colored filter 6 and a neutral filter 7. These are held in a disc 5, rotatably mounted to one side of the mirror tunnel. This disc has six circular apertures for holding such filter units evenly spaced around it. These six apertures may be located under the end of the mirror tunnel in turn by rotating the disc 5 by means of rotary solenoid 9. It is convenient to leave one of the six apertures free for the purposes of aligning, focussing and the like. The values of a suitable set of neutral filters to go with a set of colored filters to form filter units of the required characteristics for the variable contrast material currently sold under the trademark Multigrade are set out below.

| Filter No. | Neutral filter |
|---|---|
| 1 | 0.4 |
| 2 | 0.4 |
| 3 | 0.3 |
| 4 | 0.1 |
| 5 | 0.0 |

It is convenient to mount the control for the rotary solenoid on the bench on which the enlarger stands. Timing means and switching means for the lamp 1 may also be incorporated into such a control box. It is often advantageous to have a constant "simmer" voltage across the lamp to minimize surge at the beginning of an exposure. Means may also be provided for altering the voltage supplied to the lamp, and therefore its brightness, to compensate for changes in printing paper speed, or to cut down long exposure times.

I claim as my invention:

1. A method of producing prints on variable contrast photographic printing material of predetermined speed and contrast characteristics, by the use of a set of color filter units, each filter unit being severally locatable in the path of the printing light and comprising a colored filter which is so chosen that an exposure therethrough results in a print of a different contrast to an exposure through another colored filter of the set but wherein an exposure therethrough would require a different exposure time to produce a print of the same density, the colored units of the set being characterised in that each filter comprises a neutral density registered with the colored filter, the optical density of the said neutral densities being so chosen that each of the said filter units have an optical density such that the exposure time required to make a print of standard density, but varying contrast, from a negative transparency, is substantially constant irrespective of which of the filter units is located in the path of the printing light.

2. In a photographic enlarger apparatus for use in making prints on variable contrast photographic printing material of predetermined speed and contrast characteristics by use of a set of colored filters severally locatable in the path of the printing light, the colored filters being so chosen that exposures therethrough result in prints of different contrasts, but wherein exposures therethrough require different exposure times to produce prints of the same density, the improvement which comprises forming each colored filter of the set into a filter unit which comprises the said colored filter and a neutral density registered therewith the optical density of the said neutral density being so chosen that the said filter units have an optical density such that the exposure time required to make a print of standard density, but varying contrast, from a negative transparency, is substantially constant irrespective of which of the filter units is located in the path of the printing light.

3. Apparatus according to claim 2 wherein each filter unit comprises a colored filter and a neutral filter registered therewith.

4. Apparatus according to claim 2 wherein the filter units are mounted in a rotatable disc.

5. Apparatus according to claim 4 wherein means are provided, including a rotary solenoid, severally to locate each of the filter units in the path of the printing light.

6. A set of colored filter units for use in making prints on variable contrast photographic printing material of predetermined speed and contrast characteristics in a photographic enlarger apparatus, each filter unit being severally locatable in the path of the printing light and comprising a colored filter which is so chosen that an exposure therethrough results in a print of a different contrast to an exposure through another colored filter of the set but wherein an exposure therethrough would require a different exposure time to produce a print of the same density, the colored units of the set being characterised in that each filter comprises a neutral density registered with the colored filter, the optical density of the said neutral densities being so chosen that each of the said filter units have an optical density such that the exposure time required to make a print of standard density, but varying contrast, from a negative transparency, is substantially constant irrespective of which of the filter units is located in the path of the printing light.

References Cited
UNITED STATES PATENTS

| | | | |
|---|---|---|---|
| 2,557,182 | 6/1951 | Forgett | 88—24 |
| 2,764,060 | 9/1956 | Horak | 88—24 |
| 2,847,903 | 8/1958 | Modney | 88—24 |

NORTON ANSHER, Primary Examiner

RICHARD A. WINTERCORN, Assistant Examiner

U.S. Cl. X.R.

350—316; 355—35